(12) United States Patent
Zhang et al.

(10) Patent No.: US 12,085,051 B2
(45) Date of Patent: Sep. 10, 2024

(54) PERFORMANCE OF PNEUMATIC WAVE ENERGY CONVERTER (71) Applicant: DALIAN UNIVERSITY OF TECHNOLOGY, Liaoning (CN)

(72) Inventors: Chongwei Zhang, Liaoning (CN); Jierao Dai, Liaoning (CN); Dezhi Ning, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 260 days.

(21) Appl. No.: 17/799,577

(22) PCT Filed: Dec. 27, 2021

(86) PCT No.: PCT/CN2021/141441
§ 371 (c)(1),
(2) Date: Aug. 12, 2022

(87) PCT Pub. No.: WO2023/122852
PCT Pub. Date: Jul. 6, 2023

(65) Prior Publication Data
US 2023/0213014 A1 Jul. 6, 2023

(51) Int. Cl.
*F03B 13/14* (2006.01)
*F03B 11/00* (2006.01)
*G01L 9/00* (2006.01)

(52) U.S. Cl.
CPC .......... *F03B 13/142* (2013.01); *F03B 11/008* (2013.01); *G01L 9/00* (2013.01)

(58) Field of Classification Search
CPC .... F03B 13/148; F03B 13/14; F03B 13/1865; F03B 13/24; G01L 1/02; G01L 19/0046;
(Continued)

(56) References Cited

U.S. PATENT DOCUMENTS 8,629,572 B1 * 1/2014 Phillips .................. F03B 13/16
290/53
8,946,919 B2 * 2/2015 Phillips ............... F03B 13/1855
290/53

(Continued)

FOREIGN PATENT DOCUMENTS

CN 110410266 A * 11/2019

*Primary Examiner* — Andre J Allen
(74) *Attorney, Agent, or Firm* — Muncy, Geissler, Olds & Lowe, P.C.

(57) ABSTRACT

The present invention belongs to the technical field of ocean energy utilization, and provides a test system for turbine comprehensive performance of a pneumatic wave energy converter. The test system for turbine comprehensive performance of the pneumatic wave energy converter comprises a wave surface simulation system, an airflow rectifier system, a turbine device, a tabletop support structure, an instrument support frame and a sensor analysis system. A programmable linear motor is used to drive a bellows to simulate the complex oscillating airflow of the pneumatic wave energy converter; a complete sensor and measurement system is configured for various performance indexes of a turbine system; and finally, an effective technical evaluation means for the power generation efficiency and comprehensive performance evaluation of the pneumatic wave energy converter is provided. The present invention has simple assembly and disassembly technologies and high flexibility.

4 Claims, 6 Drawing Sheets

(58) Field of Classification Search
CPC ...... G01L 11/00; G01L 9/0032; G01L 11/008;
G01L 13/026; G01L 19/003; G01L
19/0092; G01L 19/02; G01L 5/00; G01L
9/0013; G01L 9/0022; G01L 9/0029;
G01L 9/0035; G01L 9/0042; G01L
9/0058; G01L 9/10; G01L 23/26; G01L
9/12
USPC .......................................... 73/170.29–170.34
See application file for complete search history.

(56) References Cited

U.S. PATENT DOCUMENTS 9,476,400 B2 * 10/2016 Phillips ................. H02M 7/064
10,047,717 B1 * 8/2018 Phillips .................. F03B 13/20

* cited by examiner

PERFORMANCE OF PNEUMATIC WAVE ENERGY CONVERTER

TECHNICAL FIELD

The present invention relates to the technical field of ocean energy utilization, in particular to a test system for turbine comprehensive performance of a pneumatic wave energy converter.

BACKGROUND

Ocean wave energy is a kind of renewable energy with huge reserves, wide distribution and great development potential. Wave energy converters are diversified in forms, and can be classified into the forms of pneumatic type, hydraulic type, mechanical type and direct-drive type according to power generation principles, wherein the pneumatic wave energy converter has great potential in industrial application due to the advantages of simple structure, fewer moving components and easy maintenance. The core structure of the pneumatic wave energy converter comprises a water surface air chamber and an air turbine. When the pneumatic wave energy converter works, a water surface in the air chamber vibrates under the action of external waves, so that the gas in the air chamber is forced to reciprocate through an air pipeline above the air chamber and the gas pushes the turbine in the air pipeline to rotate, thereby driving a motor to generate electricity. The comprehensive performance of the turbine directly determines the efficiency and stability of the pneumatic wave energy converter. Accurate test and evaluation of the comprehensive performance of the turbine is a key link in design and optimization of the wave energy converter.

The traditional turbine test system mainly uses a blast blower or an air compressor to generate unidirectional and stable airflow, and evaluates the performance of the turbine by testing the power generation effect of the turbine driven by the stable airflow, without considering the uniqueness of the pneumatic wave energy converter. For the pneumatic wave energy converter, the airflow that drives the turbine is generated by complex water surface oscillation in the air chamber. The airflow has the characteristics of reciprocativity, oscillation and randomicity, and cannot be realized by the traditional turbine test system. Therefore, the present invention aims to propose a mechanism that can simulate the complex oscillating airflow of the pneumatic wave energy converter, and configure a complete sensor and measurement system for various performance indexes of the turbine system to form a set of test system for turbine comprehensive performance of the pneumatic wave energy converter.

SUMMARY

The purpose of the present invention is to design a complete set of comprehensive performance test system for a turbine system of a pneumatic wave energy converter, use a programmable linear motor to drive a bellows to simulate the complex oscillating airflow of the pneumatic wave energy converter, configure a complete sensor and measurement system for various performance indexes of the turbine system and finally provide an effective technical evaluation means for the power generation efficiency and comprehensive performance evaluation of the pneumatic wave energy converter.

The technical solution of the present invention is as follows:

A test system for turbine comprehensive performance of a pneumatic wave energy converter comprises a wave surface simulation system, an airflow rectifier system, a turbine device, a tabletop support structure, an instrument support frame and a sensor analysis system.

Figure 2:
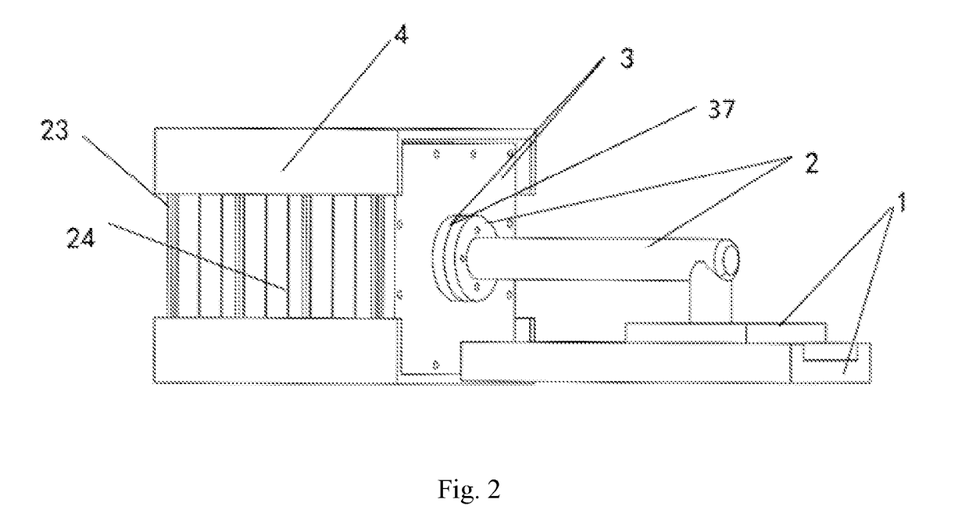
FIG. 2 is a structural diagram of a wave surface simulation system.

The wave surface simulation system comprises a bellows rectifier connecting plate 23, a compressible bellows 24, a bellows cover 4, a push plate 3, a rigid rod 2 and a programmable linear motor 1; the rigid rod 2 is placed horizontally, and both ends are fixedly connected with the programmable linear motor 1 and the push plate 3 respectively; the other side of the push plate 3 is in contact with the compressible bellows 24; the compressible bellows 24 is installed in the bellows cover 4, and the compressible bellows 24 realizes bidirectional linear motion through support protection and constraints in the bellows cover 4; the bellows rectifier connecting plate 23 is embedded into the bellows cover 4; the bellows rectifier connecting plate 23 is fixedly connected with an air outlet of the compressible bellows 24 and the airflow rectifier system; the programmable linear motor 1 drives the rigid rod 2 to perform horizontal motion which changes with time through a displacement setting signal; the rigid rod 2 drives the push plate 3 to squeeze the compressible bellows 24, and the gas in the compressible bellows 24 compresses and expands according to a set rule to simulate an air column oscillation effect caused by wave surface motion.

Figure 3:
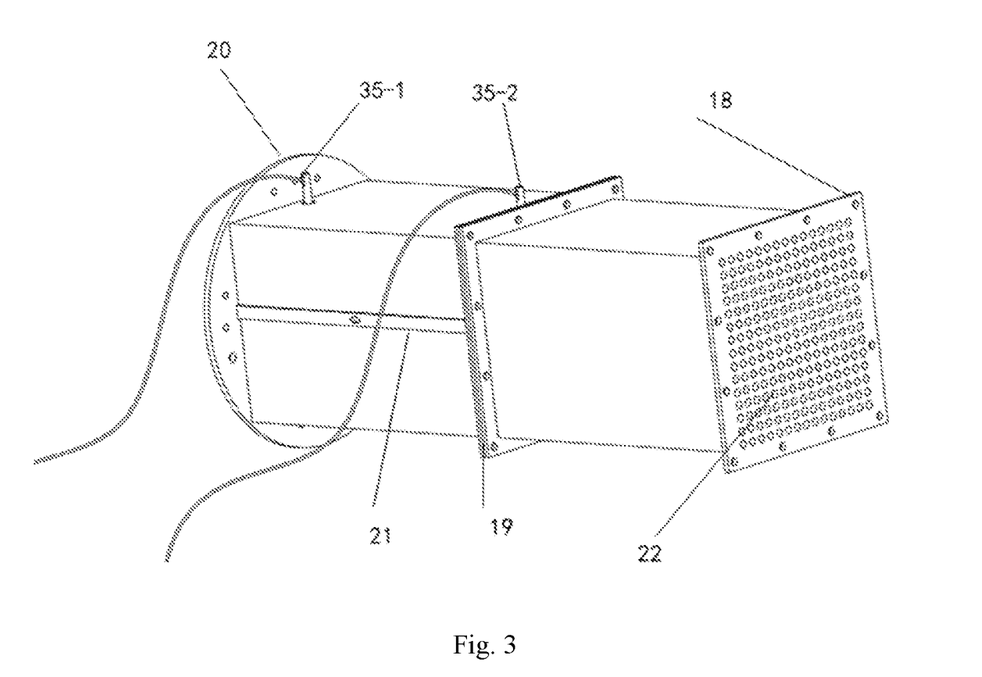
FIG. 3 is a structural diagram of an airflow rectifier system.
Figure 4:
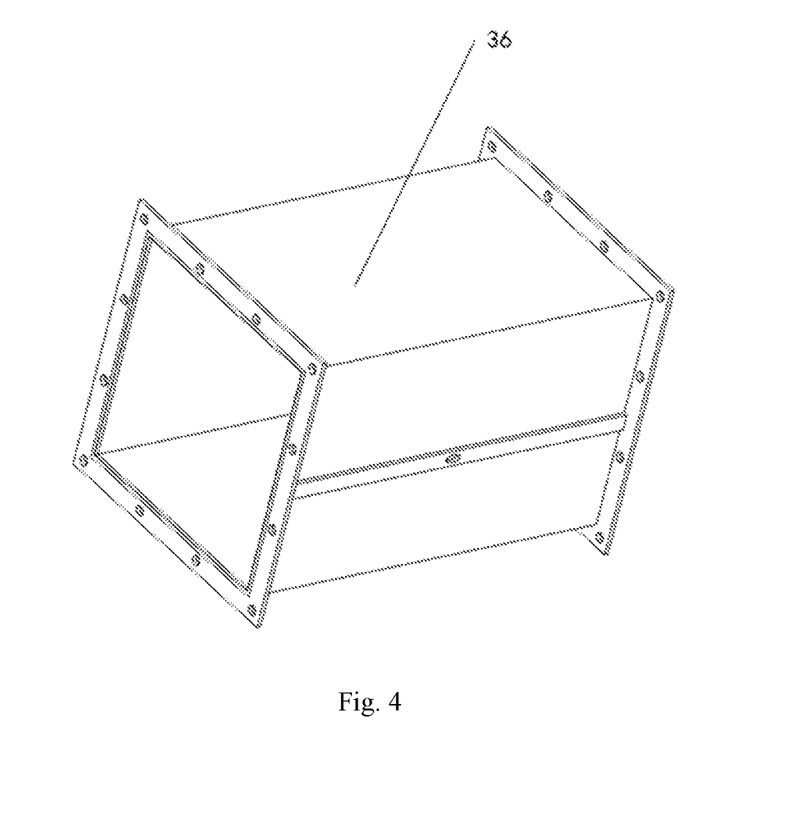
FIG. 4 is a structural diagram of a single removable diversion tube.
Figure 5:
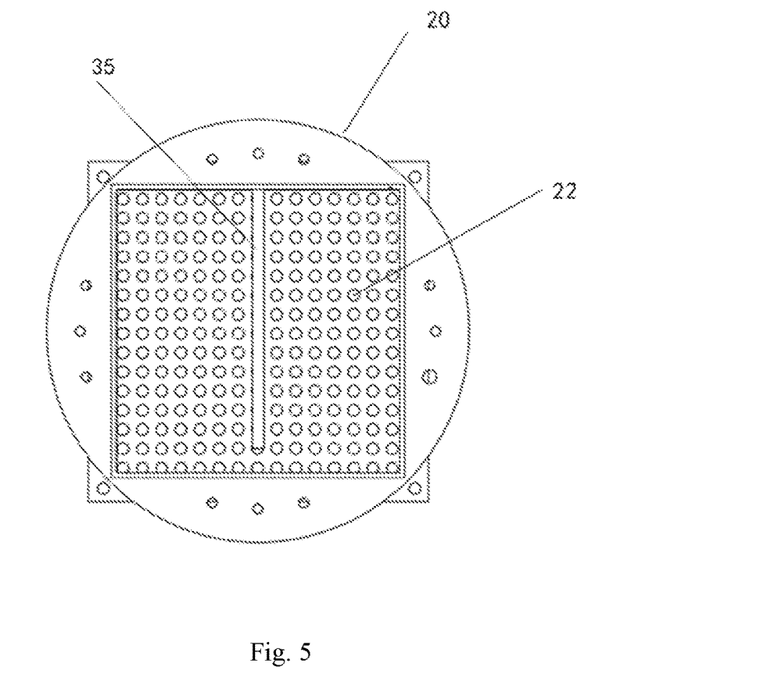
FIG. 5 is a left view of an airflow rectifier system.

The airflow rectifier system comprises a diversion turbine connecting plate 20, a gradienter 21, a diversion tube 6, a rectifier tube 5, a rectifier bellows connecting plate 18, a rectifier diversion connecting plate 19, a honeycomb tube 22 and a single removable diversion tube 36; the rectifier tube 5 is connected with the compressible bellows 24 through the rectifier bellows connecting plate 18 and the bellows rectifier connecting plate 23; the interior of the rectifier tube 5 is filled with the honeycomb tube 22, and the gas realizes a rectifier effect through the rectifier tube 5; the rectifier tube 5 is connected with the diversion tube 6 through the rectifier diversion connecting plate 19; the diversion tube 6 has one or more sections; the gradienter 21 is installed on the outer wall of each section of the diversion tube 6 for judging the levelness of the diversion tube 6; the last section of the diversion tube 6 is connected with the diversion turbine connecting plate 20, and the diversion turbine connecting plate 20 is connected with an air chamber 7 of the turbine device; and the gas enters the turbine device through the rectifier tube 5, the diversion tube 6 and the diversion turbine connecting plate 20 in sequence.

Figure 6:
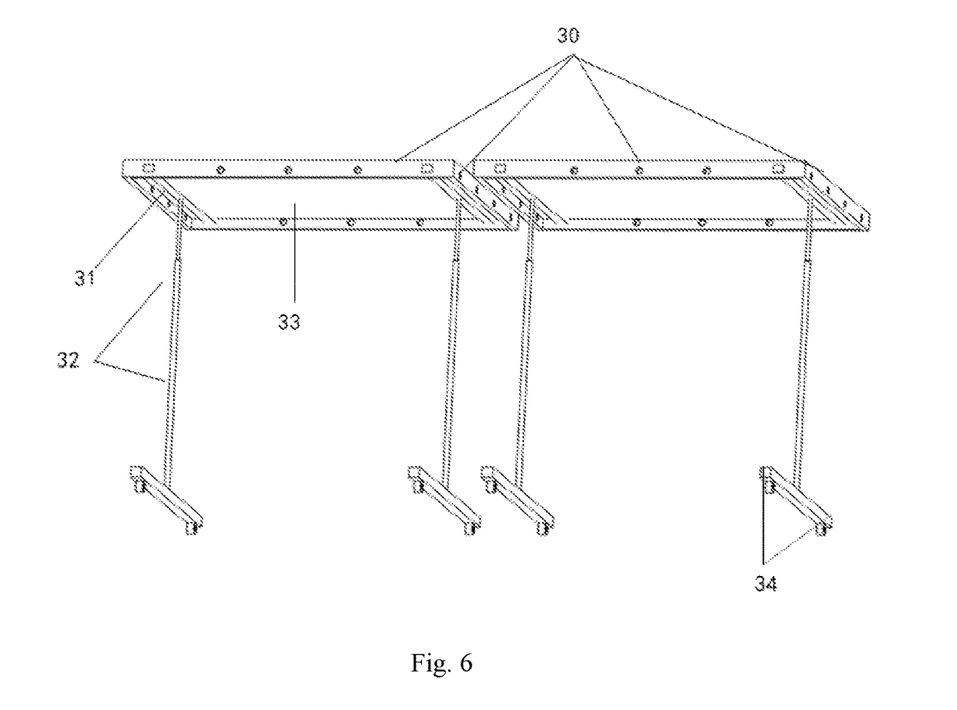
FIG. 6 is a diagram of a tabletop support structure.
Figure 8:
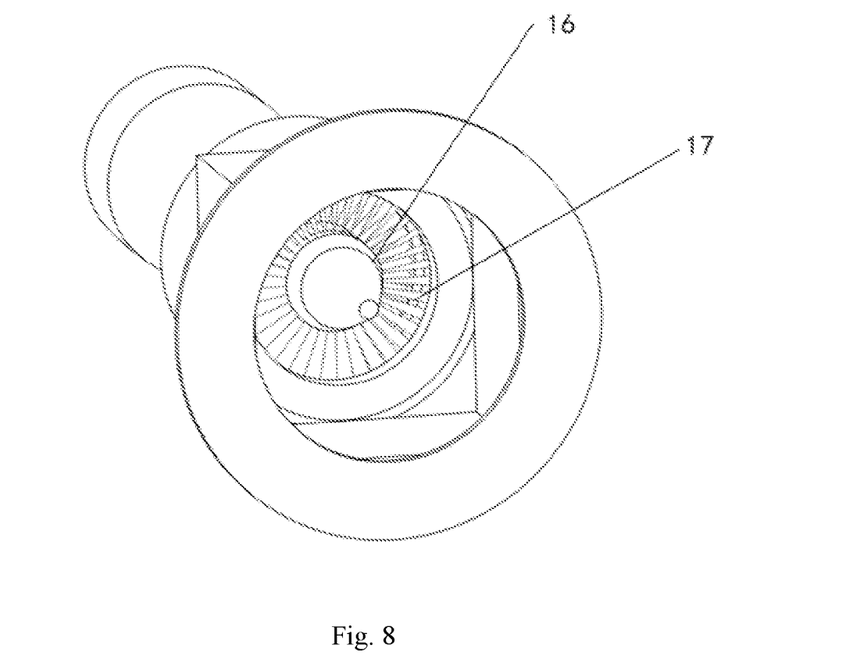
FIG. 8 is a bottom structural diagram of a turbine device.

The turbine device comprises the air chamber 7, a turbine blade 15, a diversion cone 16 and a diversion fan 17; the gas enters the air chamber 7 through the diversion tube 6; the turbine blade 15, the diversion cone 16 and the diversion fan 17 are arranged in the air chamber 7; and the gas is sprayed to the turbine blade 15 at an angle under the diversion action of the diversion cone 16 and the diversion fan 17, so that the gas rotates and drives the connected motor to generate electricity;

The wave surface simulation system, the airflow rectifier system and the turbine device are respectively fixed on the independent tabletop support structure; the tabletop support structure comprises tabletops 33, retractable legs 32, short beams 31, threaded splicing holes 30 between tables and table corner pulleys 34; the threaded splicing holes 30 between tables are arranged on the side of the tabletops 33, and the tabletops 33 are connected through the threaded splicing holes 30 between tables; the short beams 31 are arranged on the transverse sides of the tabletops 33, and are connected with the retractable legs 32 to enhance the structural stability of the tabletops 33; the retractable legs 32 are retractable rod-shaped structures, which are convenient for experimenters to adjust the height of tabletop support and the levelness of the whole instrument; the table corner pulleys 34 are installed on both sides of the bottoms of the retractable legs 32; and the table corner pulleys 34 are pulleys with brake pads, to facilitate movement and fixation.

Figure 7:
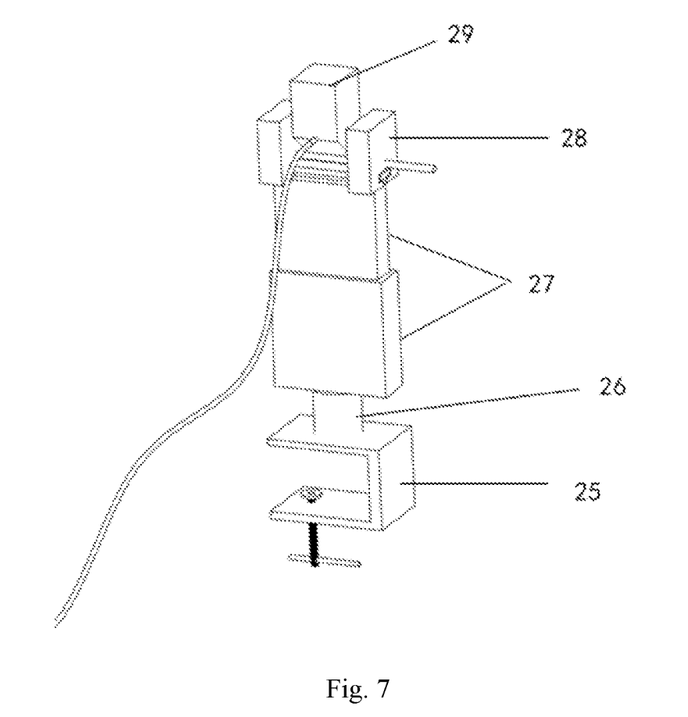
FIG. 7 is a diagram of an instrument support structure.

The instrument support frame is used to carry and fix a measuring instrument, and comprises a jaw 25, a horizontal rotating column 26, a retractable column 27 and an adjustable fixing groove 28 in sequence from bottom to top; the jaw 25 fixes the instrument support frame at the edge of the tabletops 33 by adjusting screws below; the horizontal rotating column 26 is used to ensure that the measuring instrument above the horizontal rotating column faces any horizontal direction; the retractable column 27 is used to adjust the height of the instrument support; and the adjustable fixing groove 28 adjusts the size of a clamp opening according to the size of the measuring instrument to be clamped, to fix the measuring instrument.

Figure 9:
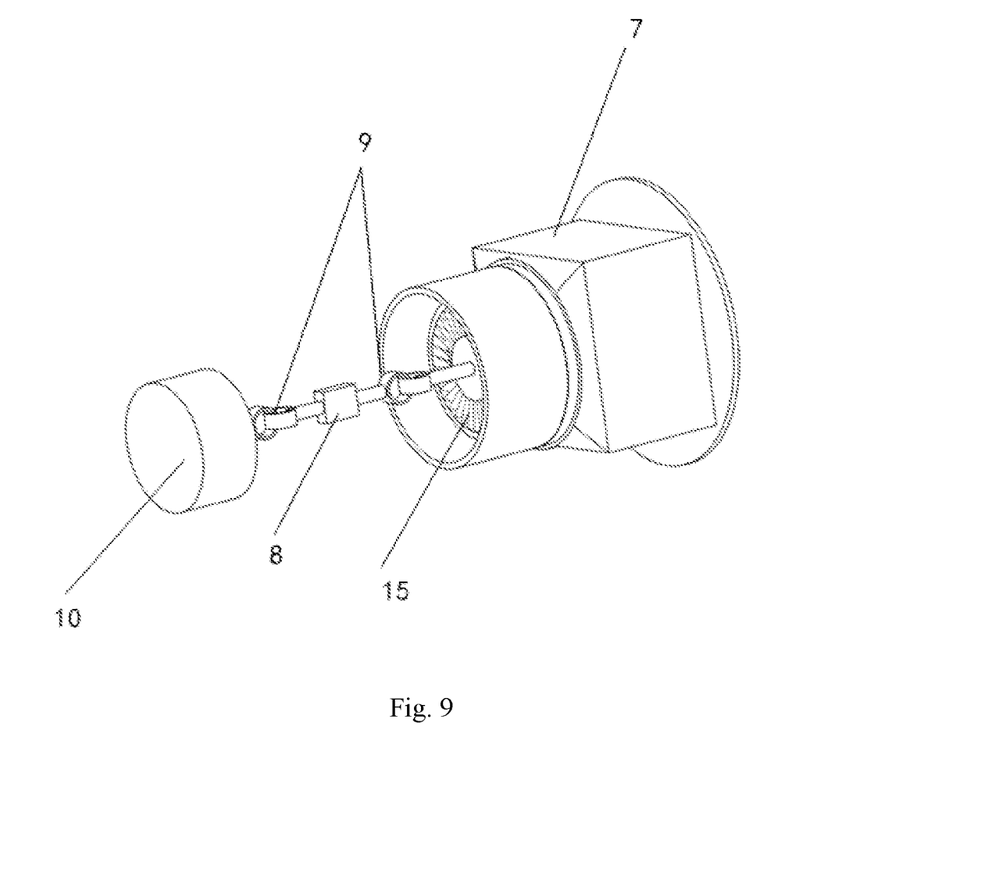
FIG. 9 is an overall diagram of a turbine device, a torque sensor and a generator.

The sensor analysis system comprises a torque sensor 8, a laser-type rotating speed sensor 11, an air velocity sensor 35, a laser-type displacement sensor 29 and a pressure sensor 37; a coupling 9 connects both ends of the torque sensor 8 to the air chamber 7 and a generator 10 respectively; the laser-type rotating speed sensor 11 is fixed by a turbine end instrument support frame 12, and is placed outside the turbine blade 15; by adjusting the attitude of the laser-type rotating speed sensor 11 and the height of the turbine end instrument support frame 12, the laser emitted by the laser-type rotating speed sensor 11 is projected horizontally to the turbine blade 15, to measure the instantaneous rotating speed of the turbine blade 15; the air velocity sensor 35 is inserted into a central axis of the diversion tube 6 through small holes at the tops of both ends of the diversion tube 6, and the small holes are sealed after the installation is completed; the air velocity sensor 35 is used to measure air speed after rectification and air speed before the turbine; the laser-type displacement sensor 29 is fixed by a push end instrument support frame 14; the attitude of the laser-type displacement sensor 29 and the height of the push end instrument support frame 14 are adjusted so that the laser emitted by the laser-type displacement sensor 29 is horizontally projected to the push plate 3, to measure the real-time displacement of the push plate 3 and calculate the change of the gas flux in the diversion tube 6; and the pressure sensor 37 is arranged between the push plate 3 and the rigid rod 2.

The bellows rectifier connecting plate 23, the diversion turbine connecting plate 20, the rectifier bellows connecting plate 18 and the rectifier diversion connecting plate 19 are provided with threaded holes with the same specification in the same position, and rubber gaskets are installed between adjacent connecting plates to ensure the tightness of the air chamber.

Figure 1:
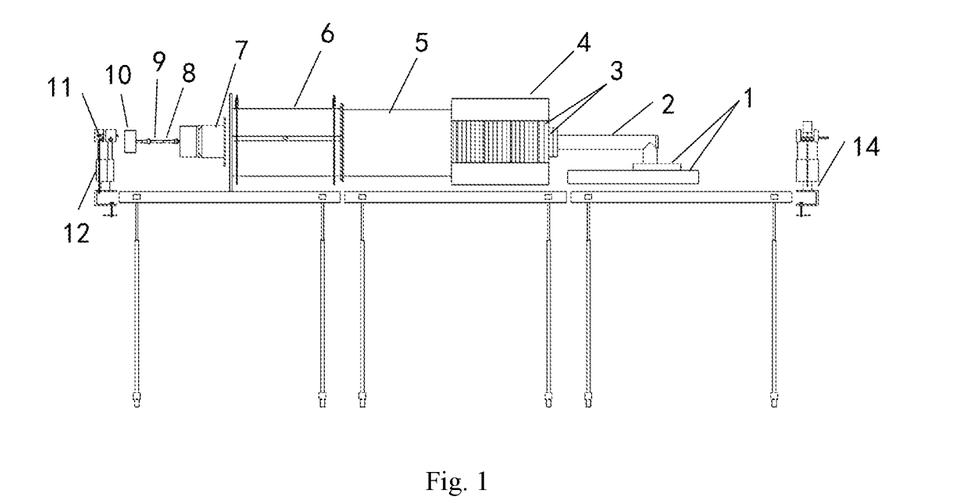
FIG. 1 is an overall structural diagram of a test system for turbine comprehensive performance of a pneumatic wave energy converter.
Figure 10:
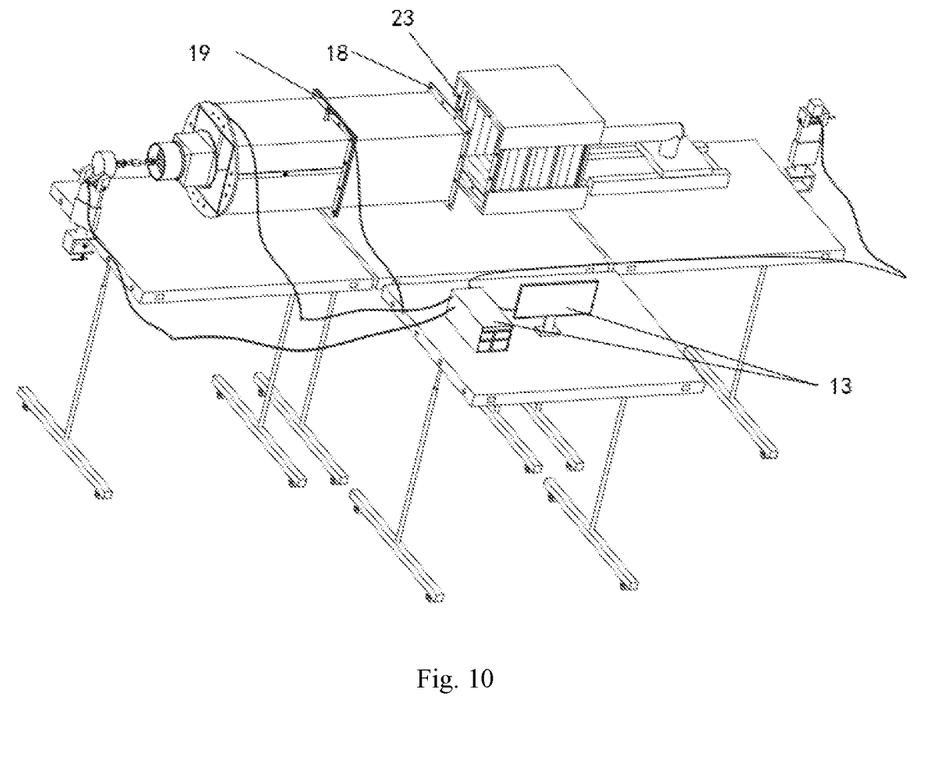
FIG. 10 is a conceptual diagram of a data processor of a test system for turbine comprehensive performance of a pneumatic wave energy converter.

Specific use steps are as follows:
Step 1. firstly, assembling the wave surface simulation system, the airflow rectifier system, the turbine device, the tabletop support structure, the instrument support structure and the sensor analysis system according to experimental needs, and adjusting a platform attitude to be horizontal by using the gradienter 21 on the outer wall of the diversion tube 6;
Step 2. adjusting the height of the instrument support frame and the attitude of each sensor, linking a sensor circuit to a data processor 13, and observing data in real time through a display screen of the data processor 13; when testing turbine devices of different sizes, making an annular diversion turbine connecting plate 20 with an outer diameter equal to the radius of the diversion turbine connecting plate 20 and an inner diameter equal to the radius of the air chamber 7 of the turbine device to be measured, and making threaded holes at corresponding positions;
Step 3. conducting a test; after the programmable linear motor 1 receives an input displacement setting signal of an experimenter, pushing the rigid rod 2 horizontally and driving the push plate 3 to reciprocate; making the push plate 3 always reciprocate within the range of the bellows cover 4; driving the compressible bellows 24 by the push plate 3 to reciprocate for squeezing air; measuring the displacement change and force change curves of the push plate 3 in real time by the laser-type displacement sensor 29 and the pressure sensor 37; connecting the compressible bellows 24 with the rectifier tube 5 through the bellows rectifier connecting plate 23; pushing the air into the rectifier tube 5 by the compressible bellows 24, and conducting gas rectification through the honeycomb tube 22; making the rectified gas enter the diversion tube 6, and measuring air velocity by an air velocity sensor a35-1 and an air velocity sensor b35-2 in the diversion tube; hermetically connecting the diversion tube 6 with the turbine device through the diversion turbine connecting plate 20; for turbine systems of different sizes, realizing close connection between the diversion tube 6 and the turbine device by adjusting the positions of the threaded holes on the diversion turbine connecting plate 20; after the gas enters the air chamber 7 of the turbine structure, under the diversion action of the diversion cone 16 and the diversion fan 17, projecting the gas at an angle to the turbine blade 15, and measuring the rotating speed of the turbine blade 15 by the laser-type rotating speed sensor 11; driving a bearing by the turbine blade 15 to rotate, driving the generator 10 to generate electricity, and measuring a real-time torque between the turbine blade 15 and a rotating shaft of the generator 10 by the torque sensor 8.

The method for evaluating the comprehensive performance indexes of the turbine is as follows: calculating mechanical energy inputted to the system by the programmable linear motor 1 by using the displacement data of the push plate 3 measured by the laser-type displacement sensor 29 and the pressure data measured by the pressure sensor 37; calculating the mechanical energy obtained by the turbine device by using the torque measured by the torque sensor 8 and the rotating speed data measured by the laser-type rotating speed sensor 11, and obtaining captivity efficiency of the turbine device through comparison with the mechanical energy inputted to the system by the programmable linear motor 1; and measuring electrical generating power of the motor, comparing with the mechanical energy obtained by the turbine, and calculating the power generation efficiency of the turbine device.

The present invention has the following beneficial effects:
(1) The laboratory simulation of the complex oscillating airflow in the air chamber of the pneumatic wave energy converter is realized; and a complete sensor and measurement system is configured for various performance indexes of the turbine system to form an evaluation method for turbine comprehensive performance of the pneumatic wave energy converter.

(2) A model test experiment that needs to be conducted in a wave flume or actual ocean is transferred to a room, which greatly reduces the risk and cost of the experiment.

(3) The test platform has modular design, simple assembly and disassembly technologies and high flexibility. A variety of test environments can be built for different turbine sizes and test needs.

In the drawings: 1 programmable linear motor; 2 rigid rod; 3 push plate; 4 bellows cover; 5 rectifier tube; 6 diversion tube; 7 air chamber; 8 torque sensor; 9 coupling; 10 generator; 11 laser-type rotating speed sensor; 12 turbine end instrument support frame; 13 data processor; 14 push end instrument support frame; 15 turbine blade; 16 diversion cone; 17 diversion fan; 18 rectifier bellows connecting plate; 19 rectifier diversion connecting plate; 20 diversion turbine connecting plate; 21 gradienter; 22 honeycomb tube; 23 bellows rectifier connecting plate; 24 compressible bellows; 25 jaw; 26 horizontal rotating column; 27 retractable column; 28 adjustable fixing groove; 29 laser-type displacement sensor; 30 threaded splicing hole between tables; 31 short beam; 32 retractable leg; 33 tabletop; 34 table corner pulley; 35 air velocity sensor; 35-1 air velocity sensor a; 35-2 air velocity sensor b; 36 single removable diversion tube; 37 pressure sensor.

DETAILED DESCRIPTION

The present invention is further described below in detail in combination with the drawings and specific embodiments.

A test system for turbine comprehensive performance of a pneumatic wave energy converter comprises a wave surface simulation system, an airflow rectifier system, a turbine system, a tabletop support structure, an instrument support frame and a sensor analysis system. When a test job is conducted, a programmable linear motor 1 receives an input displacement setting electric signal of an experimenter to start horizontal reciprocation, and a rigid rod 2 is used to drive a push plate 3 to reciprocate horizontally. The push plate 3 drives a compressible bellows 24 to reciprocate for squeezing air. At the same time, a laser-type displacement sensor 29 and a pressure sensor 37 start to collect data to measure a displacement change curve and a force change curve of the push plate 3.

After gas enters a rectifier tube 5, turbulent gas is rectified through a honeycomb tube 22. After the gas comes out of the rectifier tube 5, the gas enters the diversion tube 6; an air velocity sensor 35-2 placed at the tail of the diversion tube 6 conducts the first air velocity measurement; and then an air velocity sensor a35-1 placed at the head of the diversion tube 6 also conducts the first air velocity measurement. After the gas enters the air chamber 7 of the turbine device, the high-density gas is sprayed to the turbine blade 15 under the diversion action of a diversion cone 16 and a diversion fan 17. At this time, a rotating speed sensor 11 starts to measure the rotating speed of the turbine blade 15. At the same time, a bearing is driven by the turbine blade 15 to rotate, so that a generator 10 starts to generate electricity, and a torque sensor 8 also starts measurement work synchronously.

The product design of the present invention should fully consider the following factors:

(1) When turbine devices of different sizes are tested, an annular diversion turbine connecting plate 20 with an outer diameter equal to the radius of the diversion turbine connecting plate 20 and an inner diameter equal to the radius of the air chamber 7 of the turbine device to be measured is made according to the size of each turbine device to be measured and the size of the diversion tube 6, and threaded holes are made at corresponding positions. Therefore, the test system is reused to flexibly test and analyze the turbine devices of different sizes and forms.

(2) A connecting plate is designed at the edge of each component. When the test system is established, each component is in the same horizontal plane by using accessories such as pad blocks.

(3) The device adopts the method of compressing the gas by the push plate 3 to simulate the driving effect of a water surface on the gas in the wave energy converter. When the device is spliced and installed, the tightness of a gas channel between the push plate 3 and the turbine device is ensured.

The construction and installation processes of the test system for turbine comprehensive performance of the pneumatic wave energy converter are as follows:

(1) According to the requirements of design drawings, various components of the test system such as the diversion tube 6, the rectifier tube 5, the tabletop support structure, the instrument support structure, the compressible bellows and various pipeline box connecting blocks are made.

(2) According to the sizes of a target turbine device and the diversion tube 6, an annular diversion turbine connecting plate 20 with an outer diameter equal to the radius of the diversion turbine connecting plate 20 and an inner diameter equal to the radius of the air chamber 7 of the turbine device to be measured is made, and threaded holes are made at corresponding positions.

(3) The tabletop support structure is spliced, the instrument support structure is fixed at the corresponding position of the tabletop 33, and a bellows cover 24 is made.

(4) A pressure sensor 33 and the push plate 3 are connected, the connecting plates at both ends of the compressible bellows 24 are tightly connected with the compressible bellows 24, and the bellows cover 4 is installed.

(5) The rigid rod 2 is connected with the programmable linear motor 1; the push plate 3 is connected with one end of the compressible bellows 24; the rigid rod 2 is connected with the push plate 3; the compressible bellows 24 is connected with the rectifier tube 5; the rectifier tube 5 is connected with the diversion tube 6; and the diversion tube 6 is connected with the turbine device.

(6) The remaining sensors are arranged, and the air tightness of each component is tested and inspected through a blast blower.

(7) The placement positions and angles of each component and sensor are adjusted. The installation of the system is completed.

The specific parameters of an embodiment are as follows:

For the wave surface simulation system, the rigid rod 2 is selected from a stainless steel tube with a diameter of 0.05 m and a length of 0.6 m; the push plate 3, the bellows cover 4 and the bellows rectifier connecting plate 23 are selected from perspex sheets with a thickness of 0.01 m, and the cross-sectional size of the bellows cover 4 is 0.5 m*0.5 m; and the compressible bellows 24 uses Havela fibers with a thickness of 0.3 m as a framework material and flame-retardant platinum silicone resin with a thickness of 0.35 mm as a surface material.

The rectifier bellows connecting plate 18, the rectifier diversion connecting plate 19, the diversion tube 6, the rectifier tube 5, the diversion turbine connecting plate 20 and the single removable diversion tube 36 of the airflow rectifier system are all made of perspex with a thickness of 0.01 m. The total length of the airflow rectifier system is 0.3 m, and the cross-sectional size is 0.5 m*0.5 m.

The air chamber 7, the turbine blade 15, the diversion cone 16 and the diversion fan 17 of the turbine device are made of ABS resin material and are formed by 3D printing. The blade number, shape and inclination angle of the turbine blade 15 and the diversion fan 17 are the same. The diameters of the turbine blades 15 of different turbine devices are different, and the diameter of the diversion fan 17 is larger than the diameter of the turbine blade 15 by 0.01 m. The air chamber 7 is in the shape of a cube, and the diameter is larger than a circumscribed square of the diversion fan 17 by 0.02 m.

The tabletop 33 of the tabletop support structure is a 18 cm particle board, and 2 mm anti-static rubber is attached to the outside. Retractable legs 32 and short beams 31 are formed by 40 mm*40 mm*1 mm steel plates. The diameter of threaded splicing holes 30 between tables is 0.01 m.

The jaw 25, the horizontal rotating column 26, the retractable column 27 and the adjustable fixing groove 28 of the instrument support structure are made of ABS resin material. The cross section of the jaw 25 is 0.1 m*0.08 m*0.08 m, and the wall thickness is 0.01 m. The diameter and the height of the horizontal rotating column 26 are both 0.05 m, and the top surface of the jaw 25 is rotated horizontally by 360 degrees. The lower half part of the retractable column 27 is a 0.1 m*0.05 m*0.2 m rectangular hollow column with a wall thickness of 5 mm, and the upper half part is a 0.09 m*0.04 m*0.2 m rectangular hollow column with a wall thickness of 5 mm. The adjustable fixing groove 28 is composed of sliding blocks at both ends and sliding rails at the bottom.

The range of the torque sensor 8 of the sensor analysis system is 5 Nm to 100 Nm; and the laser-type displacement sensor has a range of 10 mm, a scope of 30+−5 mm, and accuracy of 10 microns. The pressure sensor has a range of 2000 N and accuracy of 0.1%. The generator 10 adopts a rare earth permanent magnet three-phase alternator with a rated power of 50 W.

The invention claimed is:

1. A test system for turbine comprehensive performance of a pneumatic wave energy converter, comprising a wave surface simulation system, an airflow rectifier system, a turbine device, a tabletop support structure, an instrument support frame and a sensor analysis system;

the wave surface simulation system comprises a bellows rectifier connecting plate, a compressible bellows, a bellows cover, a push plate, a rigid rod and a programmable linear motor; the rigid rod is placed horizontally, and both ends are fixedly connected with the programmable linear motor and the push plate respectively; the other side of the push plate is in contact with the compressible bellows; the compressible bellows is installed in the bellows cover, and the compressible bellows realizes bidirectional linear motion through support protection and constraints in the bellows cover; the bellows rectifier connecting plate is embedded into the bellows cover; the bellows rectifier connecting plate is fixedly connected with an air outlet of the compressible bellows and the airflow rectifier system; the programmable linear motor drives the rigid rod to perform horizontal motion; the rigid rod drives the push plate to squeeze the compressible bellows, and gas in the compressible bellows compresses and expands according to a set rule to simulate an air column oscillation effect caused by wave surface motion;

the airflow rectifier system comprises a diversion turbine connecting plate, a gradienter, a diversion tube, a rectifier tube, a rectifier bellows connecting plate, a rectifier diversion connecting plate, a honeycomb tube and a single removable diversion tube; the rectifier tube is connected with the compressible bellows through the rectifier bellows connecting plate and the bellows rectifier connecting plate; the interior of the rectifier tube is filled with the honeycomb tube, and the gas realizes a rectifier effect through the rectifier tube; the rectifier tube is connected with the diversion tube through the rectifier diversion connecting plate; the diversion tube has one or more sections; the gradienter is installed on the outer wall of each section of the diversion tube for judging the levelness of the diversion tube; the last section of the diversion tube is connected with the diversion turbine connecting plate, and the diversion turbine connecting plate is connected with an air chamber of the turbine device; the gas enters the turbine device through the rectifier tube, the diversion tube and the diversion turbine connecting plate in sequence;

the turbine device comprises the air chamber, a turbine blade, a diversion cone and a diversion fan; the gas enters the air chamber through the diversion tube; the turbine blade, the diversion cone and the diversion fan are arranged in the air chamber; the gas is sprayed to the turbine blade at an angle under the diversion action of the diversion cone and the diversion fan, so that the gas rotates and drives the connected motor to generate electricity;

the wave surface simulation system, the airflow rectifier system and the turbine device are respectively fixed on the independent tabletop support structure; the tabletop support structure comprises tabletops, retractable legs, short beams, threaded splicing holes between tables and table corner pulleys; the threaded splicing holes between tables are arranged on the side of the tabletops, and the tabletops are connected through the threaded splicing holes between tables; the short beams are arranged on the transverse sides of the tabletops, and are connected with the retractable legs; the retractable legs are retractable rod-shaped structures; the table corner pulleys are installed on both sides of the bottoms of the retractable legs;

the instrument support frame is used to carry and fix a measuring instrument, and comprises a jaw, a horizontal rotating column, a retractable column and an adjustable fixing groove in sequence from bottom to top; the jaw fixes the instrument support frame at the edge of the tabletops by adjusting screws below; the horizontal rotating column is used to ensure that the measuring instrument above the horizontal rotating column faces any horizontal direction; the retractable column is used to adjust the height of the instrument support; the adjustable fixing groove adjusts the size of a clamp opening according to the size of the measuring instrument to be clamped, to fix the measuring instrument;

the sensor analysis system comprises a torque sensor, a laser-type rotating speed sensor, an air velocity sensor, a laser-type displacement sensor and a pressure sensor; a coupling connects both ends of the torque sensor to the air chamber and a generator respectively; the laser-type rotating speed sensor is fixed by a turbine end instrument support frame, and is placed outside the turbine blade; by adjusting the attitude of the laser-type rotating speed sensor and the height of the turbine end instrument support frame, laser emitted by the laser-type rotating speed sensor is projected horizontally to the turbine blade, to measure the instantaneous rotating speed of the turbine blade; the air velocity sensor is inserted into a central axis of the diversion tube through small holes at the tops of both ends of the diversion tube, and the small holes are sealed after the installation is completed; the air velocity sensor is used to measure air speed after rectification and air speed before the turbine; the laser-type displacement sensor is fixed by a push end instrument support frame; the attitude of the laser-type displacement sensor and the height of the push end instrument support frame are adjusted so that the laser emitted by the laser-type displacement sensor is horizontally projected to the push plate, to measure the real-time displacement of the push plate and calculate the change of gas flux in the diversion tube; and the pressure sensor is arranged between the push plate and the rigid rod.

2. The test system for turbine comprehensive performance of the pneumatic wave energy converter according to claim 1, wherein the bellows rectifier connecting plate, the diversion turbine connecting plate, the rectifier bellows connecting plate and the rectifier diversion connecting plate are provided with threaded holes with the same specification in the same position, and rubber gaskets are installed between adjacent connecting plates to ensure the tightness of the air chamber.

3. The test system for turbine comprehensive performance of the pneumatic wave energy converter according to claim 1, wherein specific use steps are as follows:

step 1. firstly, assembling the wave surface simulation system, the airflow rectifier system, the turbine device, the tabletop support structure, the instrument support structure and the sensor analysis system according to experimental needs, and adjusting a platform attitude to be horizontal by using the gradienter on the outer wall of the diversion tube-;

step 2. adjusting the height of the instrument support frame and the attitude of each sensor, linking a sensor circuit to a data processor, and observing data in real time through a display screen of the data processor; when testing turbine devices of different sizes, making an annular diversion turbine connecting plate with an outer diameter equal to the radius of the diversion turbine connecting plate and an inner diameter equal to the radius of the air chamber of the turbine device to be measured, and making threaded holes at corresponding positions;

step 3. conducting a test; after the programmable linear motor receives an input displacement setting signal of an experimenter, pushing the rigid rod horizontally and driving the push plate to reciprocate; making the push plate always reciprocate within the range of the bellows cover; driving the compressible bellows by the push plate to reciprocate for squeezing air; measuring the displacement change and force change curves of the push plate in real time by the laser-type displacement sensor and the pressure sensor; connecting the compressible bellows with the rectifier tube through the bellows rectifier connecting plate; pushing the air into the rectifier tube by the compressible bellows, and conducting gas rectification through the honeycomb tube; making the rectified gas enter the diversion tube, and measuring air velocity by an air velocity sensor a(35-1) and an air velocity sensor b(35-2) in the diversion tube; hermetically connecting the diversion tube with the turbine device through the diversion turbine connecting plate; for turbine systems of different sizes, realizing close connection between the diversion tube and the turbine device by adjusting the positions of the threaded holes on the diversion turbine connecting plate; after the gas enters the air chamber of the turbine structure, under the diversion action of the diversion cone and the diversion fan, projecting the gas at an angle to the turbine blade, and measuring the rotating speed of the turbine blade by the laser-type rotating speed sensor; driving a bearing by the turbine blade to rotate, driving the generator to generate electricity, and measuring a real-time torque between the turbine blade and a rotating shaft of the generator by the torque sensor.

4. The test system for turbine comprehensive performance of the pneumatic wave energy converter according to claim 2, wherein specific use steps are as follows:

step 1. firstly, assembling the wave surface simulation system, the airflow rectifier system, the turbine device, the tabletop support structure, the instrument support structure and the sensor analysis system according to experimental needs, and adjusting a platform attitude to be horizontal by using the gradienter on the outer wall of the diversion tube;

step 2. adjusting the height of the instrument support frame and the attitude of each sensor, linking a sensor circuit to a data processor, and observing data in real time through a display screen of the data processor; when testing turbine devices of different sizes, making an annular diversion turbine connecting plate with an outer diameter equal to the radius of the diversion turbine connecting plate and an inner diameter equal to the radius of the air chamber of the turbine device to be measured, and making threaded holes at corresponding positions;

step 3. conducting a test; after the programmable linear motor receives an input displacement setting signal of an experimenter, pushing the rigid rod horizontally and driving the push plate to reciprocate; making the push plate always reciprocate within the range of the bellows cover; driving the compressible bellows by the push plate to reciprocate for squeezing air; measuring the displacement change and force change curves of the push plate in real time by the laser-type displacement sensor and the pressure sensor; connecting the compressible bellows with the rectifier tube through the bellows rectifier connecting plate; pushing the air into the rectifier tube by the compressible bellows, and conducting gas rectification through the honeycomb tube; making the rectified gas enter the diversion tube, and measuring air velocity by an air velocity sensor a(35-1) and an air velocity sensor b(35-2) in the diversion tube;

hermetically connecting the diversion tube with the turbine device through the diversion turbine connecting plate; for turbine systems of different sizes, realizing close connection between the diversion tube and the turbine device by adjusting the positions of the threaded holes on the diversion turbine connecting plate; after the gas enters the air chamber of the turbine structure, under the diversion action of the diversion cone and the diversion fan, projecting the gas at an angle to the turbine blade, and measuring the rotating speed of the turbine blade by the laser-type rotating speed sensor; driving a bearing by the turbine blade to rotate, driving the generator to generate electricity, and measuring a real-time torque between the turbine blade and a rotating shaft of the generator by the torque sensor.

\* \* \* \* \*